(12) United States Patent
Martens et al.

(10) Patent No.: US 6,515,238 B1
(45) Date of Patent: Feb. 4, 2003

(54) ANALYTICAL BALANCE FOR WEIGHING ELECTROSTATICALLY CHARGED WEIGHED GOODS

(75) Inventors: Joerg-Peter Martens, Bovenden (DE); Heinrich Feldotte, Goettingen (DE); Steffen Hirche, Goettingen (DE); Eduard Bierich, Hann. Muenden (DE); Guenter Boetcher, Bovenden (DE)

(73) Assignee: Sartorius Aktiengesellschaft, Goettingen (DE)

(*) Notice: Subject to any disclaimer, the term of this patent is extended or adjusted under 35 U.S.C. 154(b) by 58 days.

(21) Appl. No.: 09/707,962

(22) Filed: Nov. 8, 2000

(30) Foreign Application Priority Data

Nov. 8, 1999 (DE) .......................................... 199 53 586

(51) Int. Cl.⁷ .............................. G01G 21/28; H05F 3/00
(52) U.S. Cl. .................. 177/180; 177/238; 315/111.01; 315/111.91; 361/213
(58) Field of Search ................................. 177/180, 181, 177/238; 315/111.01, 111.11, 111.91; 361/213

(56) References Cited

U.S. PATENT DOCUMENTS

| | | | | |
|---|---|---|---|---|
| 2,264,495 A | | 12/1941 | Wilner ........................ 361/231 |
| 4,106,329 A | * | 8/1978 | Takahashi et al. ........ 177/25.14 |
| 4,390,768 A | * | 6/1983 | Teich et al. ................. 177/245 |
| 4,666,005 A | * | 5/1987 | Komoto et al. ............. 177/180 |
| 4,689,715 A | | 8/1987 | Halleck ....................... 361/213 |
| 5,055,963 A | * | 10/1991 | Partridge ..................... 361/231 |
| 5,430,275 A | * | 7/1995 | Braunisch .................... 177/208 |
| 5,617,648 A | * | 4/1997 | Leisinger et al. ........... 177/245 |
| 5,690,549 A | * | 11/1997 | Webb et al. ................. 454/137 |
| 5,847,514 A | * | 12/1998 | Dai ........................ 315/111.91 |
| 5,858,041 A | * | 1/1999 | Luetkemeyer ............. 55/385.2 |

FOREIGN PATENT DOCUMENTS

DE  705715  5/1941

* cited by examiner

Primary Examiner—Randy W. Gibson
(74) Attorney, Agent, or Firm—Sughrue Mion, PLLC

(57) ABSTRACT

An analytical balance that includes a balance scale, a wind guard encircling the balance scale, and an apparatus for generating an ionized stream of air for dissipating electrostatic charges of goods to be weighed. The apparatus for generating an ionized stream of air includes a blower that draws in air from the weighing space into at least one boundary surface of the weighing space. The blower also recycles the air back into the weighing space via at least one exhaust opening at another point. In this manner, highly effective dissipation of electrostatic charges is possible, and the stream of air can be conducted so that it exerts scarcely any vertical forces on the goods to be weighed. The analytical balance is very user-friendly in operation. Additionally, the apparatus for generating an ionized stream of air is preferably structured to be an easily installed optional component of the analytical balance.

26 Claims, 4 Drawing Sheets

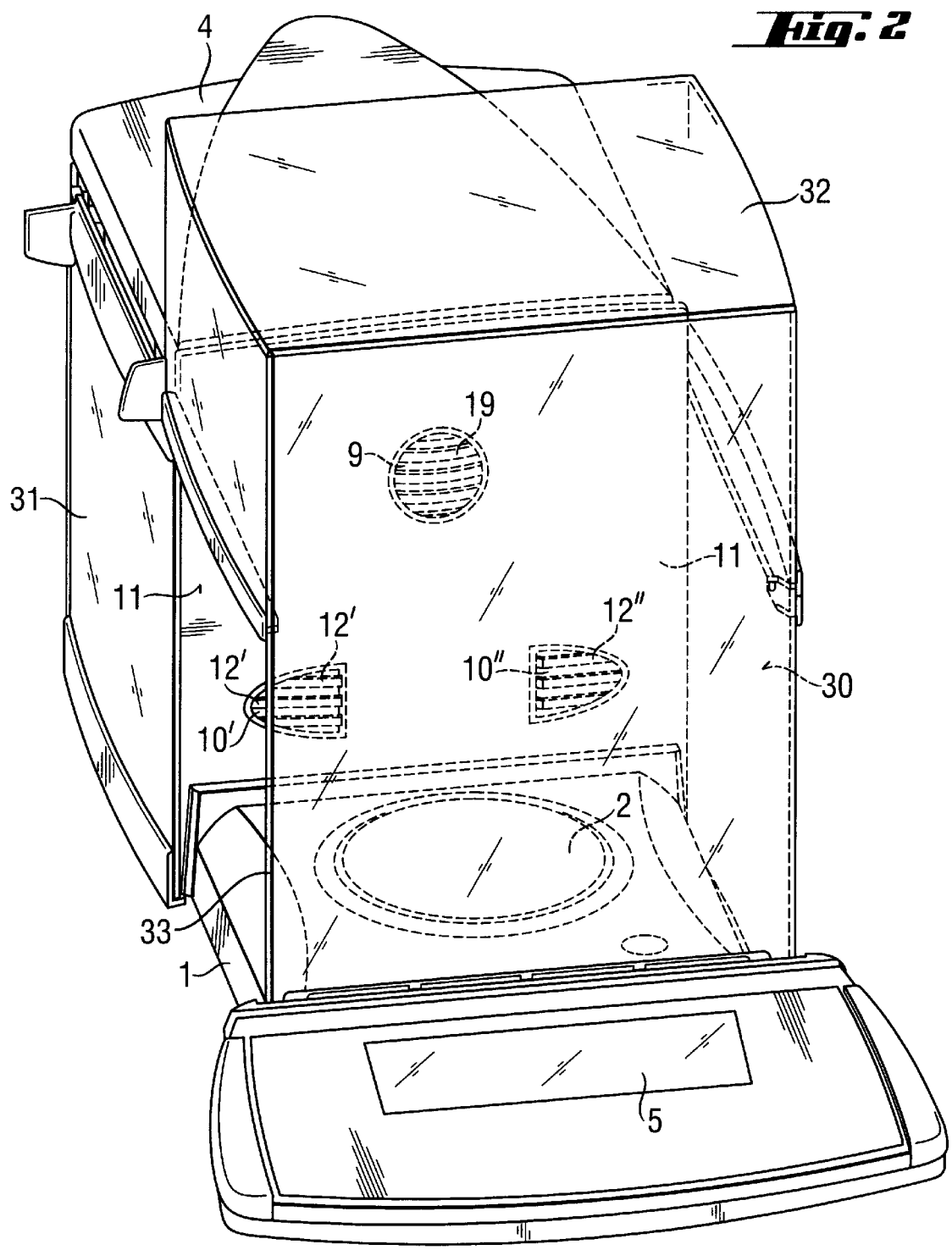

ANALYTICAL BALANCE FOR WEIGHING ELECTROSTATICALLY CHARGED WEIGHED GOODS

This is a Continuation of German Patent Application, DE 199 53 586.8 with a foreign filing date of Nov. 08, 1999, the disclosure of which is incorporated into this application by reference.

FIELD OF AND BACKGROUND OF THE INVENTION

The invention relates to an analytical balance with a balance scale, with a wind guard encircling the balance scale, and with an apparatus for generating an ionized stream of air for the dissipation of electrostatic charges on the weighed goods.

An analytical balance of this type is known from the German Patent Specification 705 715.

Several spikes, which stand vertically upwards and are connected to a high-voltage source, are located in a discharge space which is disposed below the weighing space and is connected to it by a sieve. The sieve acts therein as a large-surface counterelectrode. Thereby a so-called electric wind directed upwards is generated which is intensified by the dischargers' development of heat.

This vertical stream of air, which strikes the balance scale from below, shifts the zero point of the balance, thereby causing measurement errors. Furthermore, many ions are already discharged on the grounded metallic balance scale so that, above the balance scale, only a small part of the ions generated is still available for draining the electrostatic charge of the weighed goods.

Furthermore, it is known to dissipate electrostatic charges with an external ionization blower. Such external ionization blowers are, for example, described in U.S. Pat. No. 2,264,495 and U.S. Pat. No. 4,689,715. Therein a stream of air is generated by a blower, and this stream of air is ionized at the same time by high-voltage electrodes. Using these external ionization blowers, weighed goods can be blown on first outside the wind guard of the balance with the stream of air from the ionization blower and electrically discharged and then be brought into the balance and onto the balance scale. Alternatively, the weighed goods can be blown on by the ionization blower while on the balance scale, with the wind guard open, and electrically discharged.

Both processes are complicated to manage. In particular, if the weighed goods are insufficiently discharged in the first attempt, the wind guard must be reopened, and the weighed goods must be removed and positioned in front of the ionization blower (in the first method above), or the ionization blower must be aligned to the balance scale (in the alternative method above), and finally the wind guard must subsequently be reclosed. Because these operations require a large number of hand movements, any operator of the balance will take steps to avoid this repetition, such as running the ionization blower for too long during the first time-attempt. As a result, the weighing time is lengthened in most cases. Furthermore, blowing into the weighing space encircled by the wind guard, in the case of the latter, alternative method above, substantially disturbs the thermal equilibrium within the wind guard, so that thermal equilibrium is restored only gradually.

OBJECTS OF THE INVENTION

According to one object of the invention, it is sought to provide a balance scale having improved dissipation of the electrostatic charges of the weighed goods.

SUMMARY OF THE INVENTION

This and other objectives are achieved by the invention for a balance scale of the aforementioned type by providing an apparatus for the generation of an ionized stream of air that includes a blower. On at least one boundary surface of the weighing space, the blower draws in air from the weighing space. The blower also recycles the air drawn in from the weighing space back into the weighing space via at least one blowing outlet opening at another point.

In this manner, the invention brings a much greater number of ions into the vicinity of the weighed goods, compared to a balance scale according to German Patent Specification 705 715 discussed above, in order to achieve a rapid dissipation of the electrostatic charges. Furthermore, by suitably directing the stream, the vertical component of the stream of air in the vicinity of the balance scale can be minimized, thereby minimizing the effect on the weighing operation. By turning off the blower during the weighing, the effect on the weighing is further reduced. Thus, the invention provides a scale that makes precision weighing possible.

The analytical balance of the invention greatly simplifies handling compared to use of an external ionization blower. Beyond the normal placement of the weighed goods onto the scale, only the ionization apparatus must be started, for example by keystroke. The ionization apparatus according to the invention is operated with the wind guard closed and blows no air from the surrounding environment into the weighing space, which external air could have a different temperature. Instead, the ionization apparatus of the present invention circulates only the air contained within the weighing space.

An especially reliable dissipation of positive as well as negative electrostatic charges is obtained if the apparatus for generating an ionized stream of air generates positive as well as negative ions. For this purpose, the ionization apparatus advantageously has at least two point electrodes which have voltages of opposing polarity.

BRIEF DESCRIPTION OF THE DRAWINGS

The invention and further advantageous refinements thereof are explained in more detail below with reference to the exemplary embodiments depicted in tie drawings.

DETAILED DESCRIPTION OF THE PREFERRED EMBODIMENTS

Figure 1:
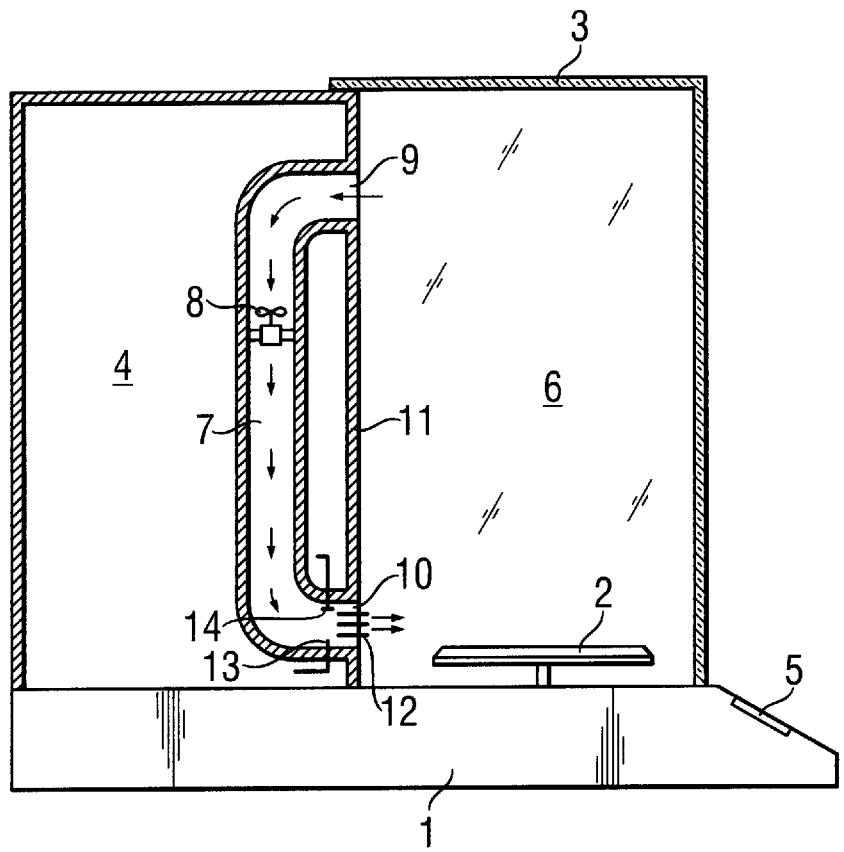
FIG. 1 shows a vertical sectional representation of an analytical balance according to the invention in schematic form, FIG. 2 provides a perspective view of the analytical balance.

FIG. 1 shows, in vertical sectional representation, significant parts of an analytical balance according to the invention to explain its principles of operation. The balance includes a lower structure 1 which houses the balance system, not shown in detail. The components of the balance system are known and thus are not illustrated in FIG. 1. The analytical balance further comprises a balance scale 2 to receive the goods to be weighed, a wind guard 3 that encircles the weighing space 6 on all sides, a display 5 for displaying the weight, and a rearward upper part 4 of the housing which, for example, can accommodate parts of the electronics for the balance. These parts of the balance are generally known and thus not explained in more detail.

In the rearward upper part 4 of the housing, a tube 7 is disposed with a fan 8 installed. The tube 7 ends in an intake opening 9 at an upper location in the rear wall 11 of the weighing space. The tube 7 ends in at least one exhaust opening 10 in a lower location of the rear wall 11 of the weighing space. The direction of conveyance of the fan 8 is accordingly from above to below. The exhaust blowing opening 10 has lamellas 12 that flatten out the exiting stream of air and direct it in defined directions. Even though these lamellas are represented in FIG. 1 as extending in the horizontal direction, the lamellas can also be directed in, or supplemented with lamellas extending in the vertical direction. Moreover, the lamellas 12 can, if needed, be fully adjustable and thus permit adaptation to goods to be weighed of different sizes and heights.

The high-voltage electrodes for the ionization of the stream of air are denoted by 13 and 14. In the embodiment of FIG. 1, the electrode 13 is a point electrode, and the electrode 14 is a comparatively large-surface electrode, for example in the form of a small plate or a wire ring. In the event the tube 7 is formed of metal, this metal tube can function directly as a large-surface counterelectrode 14. The circuit for generating the high-voltage and the feed lines to the electrodes 13 and 14 have been omitted in the schematic representation of FIG. 1 for simplicity's sake, as have been the feed lines and the power supply for the motor of the fan 8.

During operation, the fan 8 draws air from the weighing space 6 at the intake opening 9 and enriches this air with ions by moving the air past the high-voltage electrodes 13, 14. The fan 8 further blows this air made electrically conductive out through the exhaust opening 10, and distributes this air in the space above the balance scale 2, where the weighed goods to be discharged electrically are disposed. In this manner, a discharge of ions at the metallic balance scale 2 is substantially avoided. As the airflow through the fan 8 is significantly greater than the airflow due to convection according to the prior art, the electrostatic charges of the weighed goods are much more effectively drained than in the case of the prior-art balance. Furthermore, the predominantly horizontal stream of air exerts scarcely any vertical forces on the balance scale 2, so that the effect on the results of weighing is small. In addition the fan 8 can be turned off. When the fan propeller comes to rest, the resulting airflow resistance causes the airflow through the tube 7 to come to a stop nearly instantaneously, thereby ending the circulation of air in the weighing space. In addition, the previous circulation of air through the fan 8 prevents development of essentially any temperature gradients in the weighing space 6, so that after turning the fan 8 off, the remaining thermal convection is minimal. If the fan 8 is turned on after closing the weighing space 6, e.g. for 20 seconds, then nearly complete dissipation of any electrostatic charge of the weighed goods is achieved in this time period, and, in addition, the formation of thermal gradients is prevented so that ideal conditions for highly precise weighing prevail thereafter.

One embodiment of the electronic balance is represented in perspective view in FIG. 2. The parts illustrated in FIG. 1 are denoted by the same reference numbers. Among the parts of the wind guard which encircles the weighing space, the right sliding door 30, the left sliding door 31, which is illustrated as being open, the upper enclosing element 32, and the (fixed) rear wall 11 are shown in FIG. 2. The front transparent wall of the wind guard can be located by its left lateral edge 33. The upper intake opening 9 is covered with protective bars 19, which prevent the entry of larger particles, thereby protecting the blowers from damage. Two outlet openings 10' and 10" are provided, for the exit of the ionized air, and include lamellas 12' and 12" for deflecting the stream of air. The ionization electrodes are not visible in FIG. 2. They are described with the aid of FIG. 3.

Figure 3:
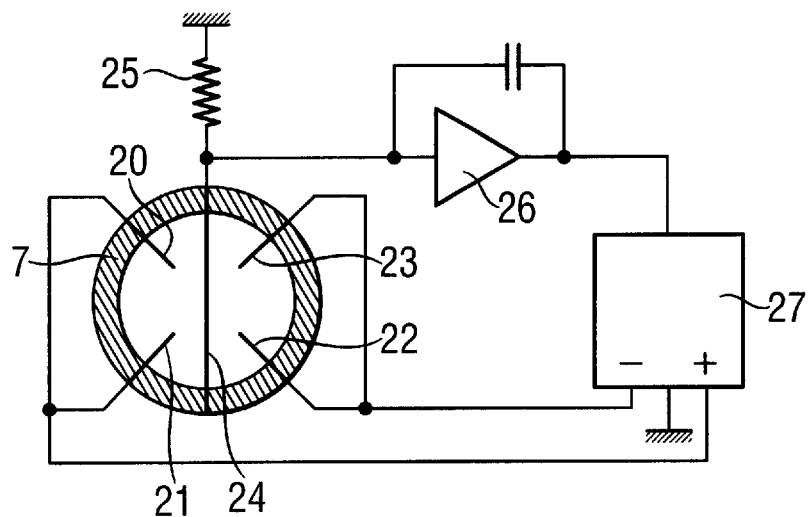
FIG. 3 depicts one advantageous form and arrangement of the electrodes for ionization.

FIG. 3 shows a cross-section of the tube 7 and the mounted high-voltage electrodes for the ionization in an advantageous form and arrangement. The arrangement of electrodes contains two point electrodes 20 and 21 which are connected to the positive terminal of a high-voltage source 27 and two point electrodes 22 and 23 which are connected to the negative terminal of the high-voltage source 27. Between the two pairs of point electrodes, there is located a counterelectrode 24, by way of example in the form of a wire or a sheet, which is grounded via a resistor 25. The positive and the negative voltage of the high-voltage source 27 are set at a level at which discharge still barely occurs by so-called still discharge, rather than by spark discharge. The two voltages of the high-voltage source 27 are controlled therein by a controller 26 so that the current through the resistor 25 is maintained at zero. Thereby, it is ensured that, independent of tolerances of the electrode geometry and independent of aging processes (for example, contamination of the electrodes), the same current flows over each pair of point electrodes 20 and 21 and point electrodes 22 and 23, so that approximately equal numbers of positive and negative ions are generated. Accordingly, the stream of air exiting through the exhaust opening 10' and 10" contains positive as well as negative ions, such that positively as well as negatively charged weighed goods can be effectively discharged.

Figure 4:
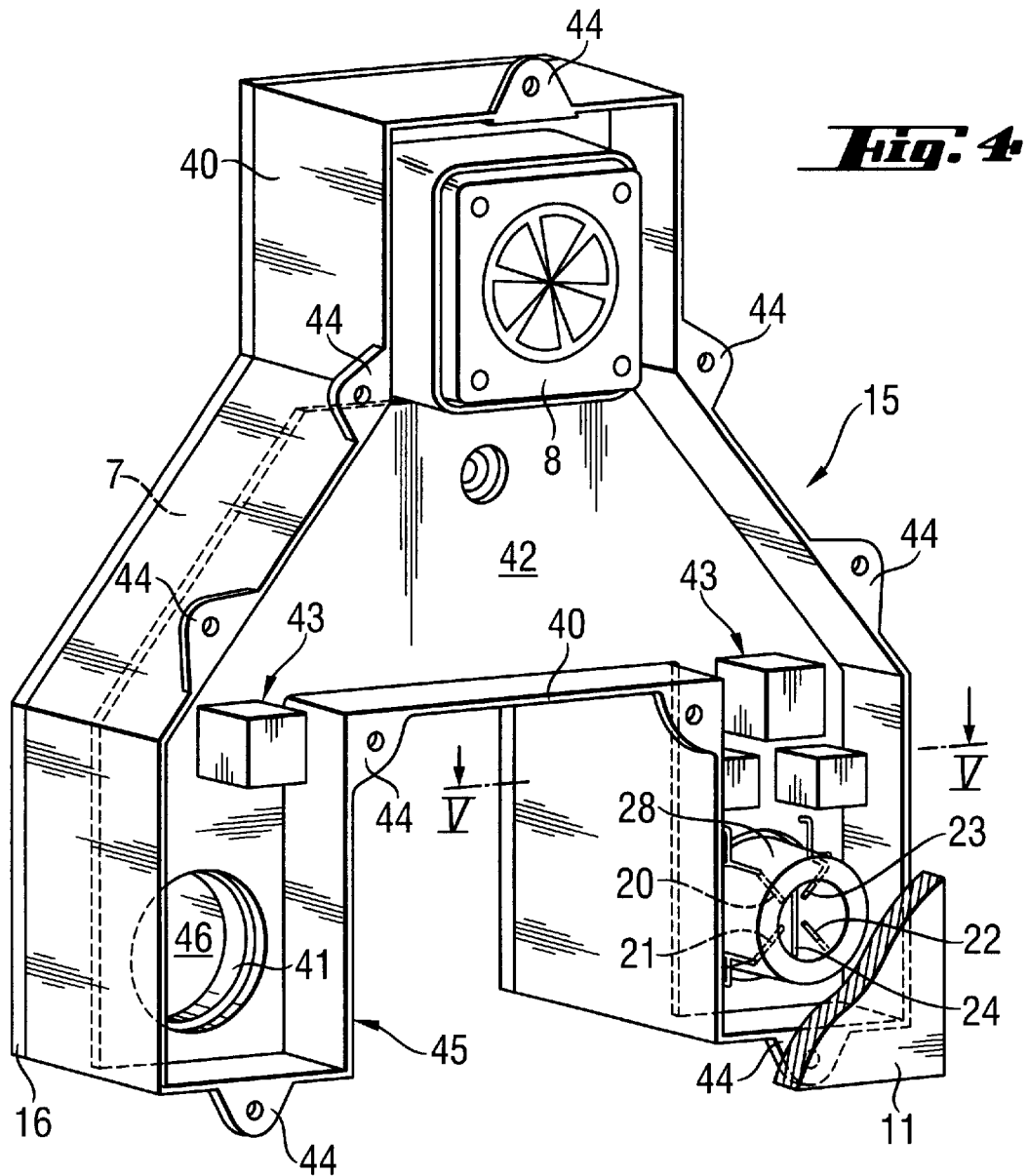
FIG. 4 depicts one embodiment of the apparatus for generating the ionized stream of air.
Figure 5:
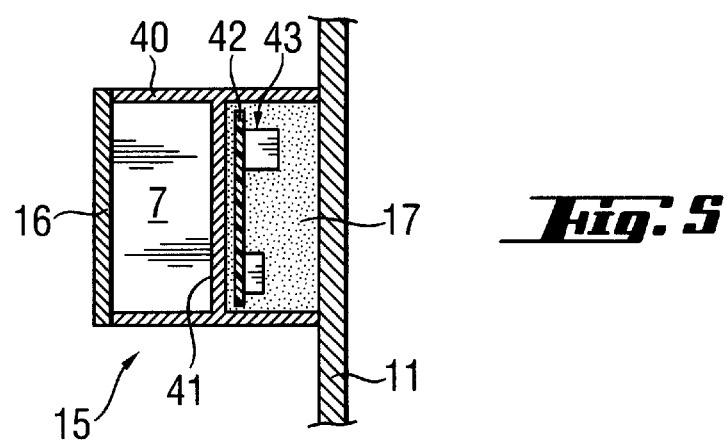
FIG. 5 shows a section along the line V—V in FIG. 4.

An advantageous and compact configuration of the apparatus for generating an ionized stream of air is shown in FIGS. 4 and 5. FIG. 4 is a perspective view, whereas FIG. 5 shows a section along the dotted line V—V in FIG. 4. A Y-shaped formed part 15 is shown in the figures, which basically includes an encircling frame 40 and an intermediate substrate 41 which is located at about half way up the height of the frame 40. This intermediate substrate 41 is visible only in FIG. 5 because in FIG. 4 it is hidden below an electronic circuit board 42, which, together with the fan 8, occupies essentially the entire interior space of the formed part 15. The electronic components located on the electronic circuit board 42 are depicted only by the cubes 43, illustrated by way of example. In reality, the entire electronic circuit board 42 may be provided with components.

The intermediate substrate 41 divides the interior space of the formed part 15 into two areas: one area for the electronics (shown in FIG. 4 on the front side and, in FIG. 5, on the right) and one area (obstructed from view in FIG. 4 and shown in FIG. 5 on the left) which defines the air channel 7 and which leads from the fan 8 to the high-voltage electrodes 20 to 24. The intermediate substrate 41 is penetrated near the fan 8 and near the high-voltage electrodes, as illustrated in FIG. 4. Specifically, in the left leg 45 of the Y-shaped formed part 15, neither the high-voltage electrodes nor their holder 28 are shown, so that the hole 46 in the intermediate substrate 41 is visible. In reality, an electrode holder 28 and high-voltage electrodes 20 to 24 are provided in the left leg 45. Likewise the cross-section of the left leg 45 is the same as the cross-section (represented in FIG. 5) through the right leg.

The formed part 15 is closed off at its end surface (in FIG. 4 back or in FIG. 5 left) by an appropriately configured cover 16. The formed part 15, together with fan 8 and electrode holder 28, is screwed on the back side of the back wall 11 of the wind guard, facing away from the weighing space 6, by means of tongues 44 with holes. These parts are held together, as can be seen in FIG. 5. The formed part 15 is attached such that the fan 8 is located directly behind the intake opening 9, while the two electrode holders 28 with the high-voltage electrodes are positioned behind the two exhaust openings 10' and 10" in FIG. 2. Thus, during operation, the fan 8 draws air from the weighing space 6 through the intake opening 9, transports it back into the air channel 7 between the intermediate substrate 41 of the formed part 15 and the cover 16, and pushes the air through the hole 46, i.e., through the interior of the electrode holder 28 which is provided with the high-voltage electrodes 20 to 24, and finally through the exhaust opening 10' and 10" back into the weighing space 6.

The space above and around the electronic circuit board 42 is advantageously filled entirely with an insulating material 17, which is indicated in FIG. 5 by dots. The housing of the fan 8 and the electrode holders 28 prevent the insulating material from flowing out through the hole in the intermediate substrate 41 at the fan 8 and through the holes 46 at the electrode holders 28. The encircling frame 40 acts as a lateral enclosing element during introduction of insulating material.

The back wall 11 advantageously has, on its back side facing away from the weighing space 6, an encircling protuberance around each of the intake opening 9 and the exhaust openings 10' and 10". These protuberances, in cooperation with the elastic insulating material 17, seal the intake opening 9 and the exhaust openings 10' and 10" against the surrounding environment.

The apparatus described above for generating an ionized stream of air can be further improved by incorporating many additional advantageous refinements.

For example, the fan 8 can be provided with a control for regulating the speed of revolution. This permits the apparatus to be adapted both for use with strongly charged goods to be weighed (large speed of revolution with strong circulation of air) as well as for uses requiring high precision weighing and short settling time after being turned off (small speed of revolution with low circulation of air). This refinement provides the ability to weigh with the fan running slowly.

The fan 8 can be designed to be turned off, for example, by an electrical contact or by a photosensor when the lateral wall 30 or 31 or the upper enclosing element 32 of the weighing space is closed. The fan 8 is then turned off after a predetermined running time. Of course, a button or a switch can also be provided within the framework of the operator keyboard for turning the fan 8 on or off manually. The high-voltage source 27 is in general turned on or off together with the fan 8. However, it can also be designed to be switched on or off independently.

It is further possible to design the controller 26 so that the offset (electrical zero point) can be shifted away from the voltage zero at the resistor 25 and instead set to a predetermined positive or negative voltage value. Thereby the current over one pair of electrodes 20, 21 or 22, 23 is greater than the current over the other pair of electrodes. In this way ions of one sign are preferably generated and the discharge effect for the electrostatic charge of opposite sign for the goods to be weighed is increased. This is useful if similar samples, in which the sign of the charge is constant and known, are being weighed.

The lamellas 12 or 12' and 12" can be adjustable in order permit adaptation of the ionized stream of air to weighed goods of different sizes and weights.

Overall the described apparatus for generating an ionized stream of air forms a compact structural unit which contains all the components necessary for performing an ionization function. In the framework of a building block system, it is thereby possible to equip an analytical balance, with or without an apparatus for generating an ionized stream of air. In a given case, the analytical balance can later be retrofitted with such an apparatus for generating an ionized stream of air if warranted.

Figure 6:
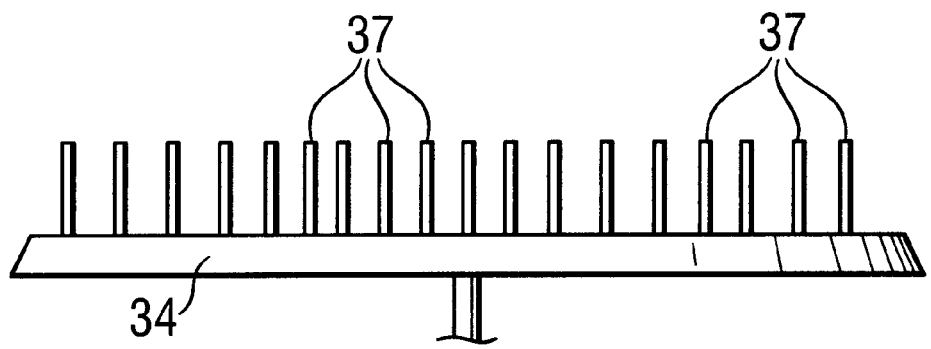
FIG. 6 depicts one advantageous configuration of the balance scale.

An embodiment of a balance scale which is particularly advantageous for electrostatically charged goods to be weighed is shown in FIG. 6. This balance scale 34 has a plurality of thin vertical metallic pins 37, similar to a bed of nails, on its upper side. The goods stand on these pins 37 and can thereby be exposed on their lower side as well to ionized air and thereby discharged. It is noted that the metallic balance scale 34 and the metallic pins 37 cause the discharge of many ions. However, by virtue of the large number of ions present and the good transport of the ionized air, the remaining ions are sufficient to fully discharge the weighed goods.

Figure 7:
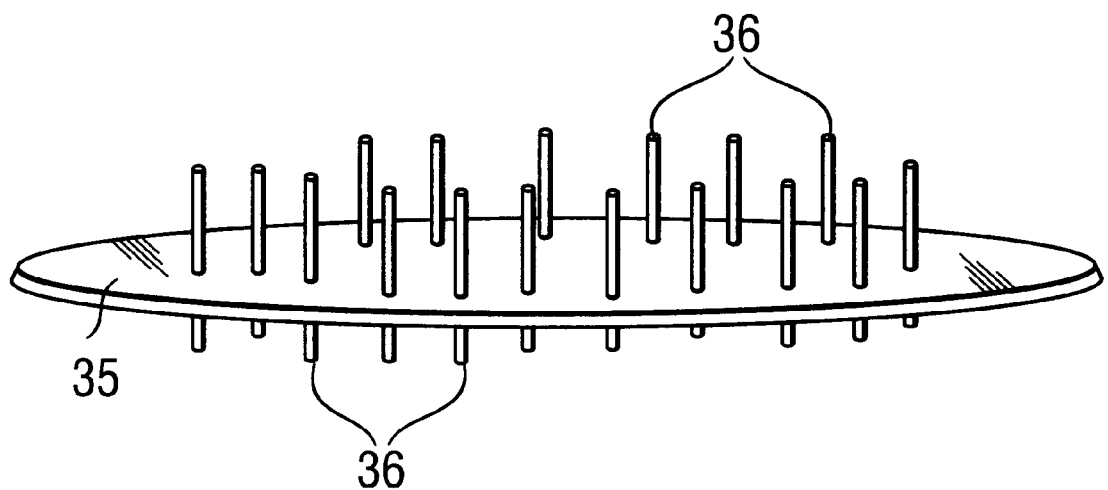
FIG. 7 shows an attachment for a standard balance scale.

In FIG. 7 a variant of the nail bed balance scale is shown in perspective view. Here a disk 35, which has vertical metal pins 36 on its upper side as well as on its lower side, is laid on the normal balance scale 2 (in FIG. 1 or 2). This configuration permits exposure of the weighed goods to ionized air on all sides.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An analytical balance comprising:
   a balance scale;
   a wind guard defining a weighing space, the weighing space encircling said balance scale and having at least one boundary surface containing at least one intake opening and at least one exhaust opening; and
   an apparatus generating an ionized stream of air and comprising a blower,
   wherein said blower draws in air from the weighing space via the at least one intake opening and recycles the air into the weighing space via the at least one exhaust opening.

2. The analytical balance according to claim 1, wherein said apparatus generating an ionized stream of air further comprises high-voltage electrodes disposed between said blower and the exhaust opening.

3. The analytical balance according to claim 2, wherein said high-voltage electrodes comprise:
   at least one positive point electrode, at least one negative point electrode, and
   a respective counterelectrode,
   wherein said positive and negative point electrodes have voltages of opposing polarity.

4. The analytical balance according to claim 3, further comprising:
a high-voltage source; and
a controller,
wherein said controller controls said high-voltage source so that a discharge stream over said at least one positive point electrode is as large as a discharge stream over said at least one negative point electrodes.

5. The analytical balance according to claim 3, further comprising:
a high-voltage source; and
a controller,
wherein said controller controls said high-voltage source so that a difference of a discharge stream over said positive point electrode and a discharge stream over said negative point electrode assumes a constant value.

6. The analytical balance according to claim 2, further comprising:
a high-voltage source; and
a controller,
wherein said controller controls said high voltage source such that no spark discharge occurs from said high-voltage electrodes.

7. The analytical balance according to claim 1, wherein the intake opening is located in an upper area of a rear wall of the weighing space.

8. The analytical balance according to claim 1, wherein the exhaust opening is located in a lower area of a rear wall of the weighing space.

9. The analytical balance according to claim 1, wherein the exhaust opening is located at least partly vertically above said balance scale.

10. The analytical balance according to claim 1, wherein the at least one exhaust opening comprises auxiliary aids that deflect the ionized stream of air into a preferred direction in the weighing space.

11. The analytical balance according to claim 10, wherein said auxiliary aids comprise lamellas.

12. The analytical balance according to claim 10, wherein said auxiliary aids are configured to adjust at least one of a direction and an intensity of the ionized stream of air.

13. The analytical balance according to claim 1, wherein said blower is configured with a variable speed control.

14. The analytical balance according to claim 1, wherein said blower is configured to switch off automatically after a predetermined time period.

15. The analytical balance according to claim 14, wherein said wind guard comprises two displaceable weighing-space enclosing elements and a contact disposed on at least one of said enclosing elements, wherein said blower is switched on by actuation of said contact and is switched off after the predetermined time period.

16. The analytical balance according to claim 14, wherein said wind guard comprises two displaceable weighing-space enclosing elements and a photosensor disposed on at least one of said enclosing elements, wherein said blower is switched on by actuation of said photosensor and is switched off after the predetermined time period.

17. The analytical balance according to claim 7, wherein said apparatus generating an ionized stream of air further comprises a formed part, said formed part comprising: channels conducting the air between the intake opening and the exhaust opening;
fastening points for mounting said blower;
a mounting space for a high-voltage source; and
mounting points for mounting said formed part on a back side of the analytical balance on the rear wall, facing away from the weighing space.

18. The analytical balance according to claim 17, wherein said formed part further comprises a space for mounting controller electronics.

19. The analytical balance according to claim 17, wherein said formed part is formed in an H-shaped cross-section defining two chambers, a first chamber disposed nearer to said back wall and a second chamber disposed at a distance from said back wall,
wherein said high-voltage source is housed in said first chamber, and said second chamber contains a channel for conducting the air.

20. The analytical balance according to claim 19, wherein said apparatus generating an ionized stream of air further comprises a cover closing off said formed part on a side facing away from said back wall and defining one boundary surface of said second chamber.

21. The analytical balance according to claim 17, wherein said formed part is formed in a Y shape and connects the intake opening to two exhaust openings.

22. The analytical balance according to claim 17, wherein said high-voltage source is injection-molded to said formed part and said formed part forms an injection mold for injection-molding said high voltage source to said formed part.

23. The analytical balance according to claim 22, further comprising elastic insulating material forming a seal between said formed part and said back wall.

24. The analytical balance according to claim 1, further comprising a plurality of thin vertical metallic pins positioned on an upper side of said balance scale.

25. The analytical balance according to claim 1, further comprising a disk comprising a plurality of vertical metal pins projecting from an upper side and from a lower side of said disk, said disk positioned on said balance scale.

26. An analytical balance comprising:
a balance scale;
a wind guard defining a weighing space, the weighing space encircling said balance scale and having at least one boundary surface containing at least one intake opening and at least one exhaust opening; and
an apparatus comprising:
a blower;
at least two electrodes coupled to a voltage source; and
a channel that connects the intake opening and the exhaust opening;
wherein said blower draws in air from the weighing space via the intake opening and moves the air through said channel past said electrodes and returns the air into the weighing space via the exhaust opening.

* * * * *